United States Patent Office 3,686,223
Patented Aug. 22, 1972

3,686,223
D-HOMOESTRATRIENES
Theodore C. Miller, East Greenbush, N.Y., assignor to Sterling Drug Inc., New York, N.Y.
No Drawing. Original application Dec. 6, 1967, Ser. No. 688,318, now Patent No. 3,475,419, dated Oct. 28, 1969. Divided and this application Dec. 26, 1968, Ser. No. 787,246
Int. Cl. C07d 13/00
U.S. Cl. 260—340.5    9 Claims

ABSTRACT OF THE DISCLOSURE 17,17a - dioxygenated 3 - oxy - D - homoestra - 1,3,5(10)-trienes, having estrogenic and hypocholesteremic activity, are prepared by way of pyrolytic or Lewis acid rearrangement of 17 - hydroxy - 3 - oxy - estra - 1,3,5(10)-triene-17α-carboxaldehydes.

---

This application is a division of my copending application Ser. No. 688,318, filed Dec. 6, 1967, now U.S. Pat. No. 3,475,419.

This invention relates to new D-homo aromatic steroids, and in particular is concerned with 17,17a-dioxygenated 3 - oxy - D - homoestra - 1,3,5(10) - trienes, with the method preparation thereof, and with intermediates in said preparation.

The 17,17a-dioxygenated 3-oxy-D - homoestra - 1,3,5(10)-trienes of the invention have the structural formula

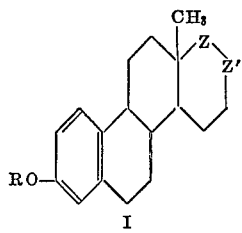

wherein R is hydrogen, lower-alkyl or acyl; and Z and Z' are C=O, CH(OH) or CH(O-acyl), acyl in each instance being carboxylic acyl having from one to twelve carbon atoms. Also included are lower-alkanone-cyclic acetals of the above compounds wherein Z and Z' are each CH(OH).

When R in the above Formula I stands for lower-alkyl, the lower-alkyl group can have from one to six carbon atoms, thus including, for example, such groups as methyl, ethyl, propyl, isopropyl, butyl, hexyl, and the like.

The term acyl as used throughout stands for carboxylic acyl having from one to twelve carbon atoms, preferably having a molecular weight less than about 250. Representative of the carboxylic acyl radicals which can be present are lower-alkanoyl, e.g., acetyl, propionyl, isobutyryl, caproyl, heptanoyl, octanoyl, dodecanoyl, trimethylacetyl, and the like; carboxy-lower-alkanoyl, e.g., hemisuccinyl, hemiglutaryl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; carbamyl, including unsubstituted carbamyl, N-lower-alkylcarbamyl and N,N-di-lower-alkylcarbamyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can preferably have from one to four carbon atoms.

The lower-alkanone-cyclic acetals of compounds of Formula I wherein Z and Z' are each CH(OH) are derived from lower-alkanones having from three to about ten carbon atoms, for example, acetone, methyl ethyl ketone, dipropyl ketone, isopropyl methyl ketone, dibutyl ketone, dipentyl ketone, and the like. The hydroxy groups at the 17 and 17a positions may have either the α- or β-configuration, and in a given compound the configuration of the hydroxy groups at 17 and 17a can be the same or different.

The compounds of Formula I are prepared from 17-hydroxy - 3 - RO - estra - 1,3,5(10) - triene - 17α-carboxaldehydes (II), wherein R has the meaning given hereinabove. The process involves heating a 17-hydroxy-3 - RO - estra - 1,3,5(10) - triene - 17α - carboxaldehyde, or treating it with a Lewis acid, which produces a compound of Formula I wherein Z is CH(β-OH) and Z' is C=O (III):

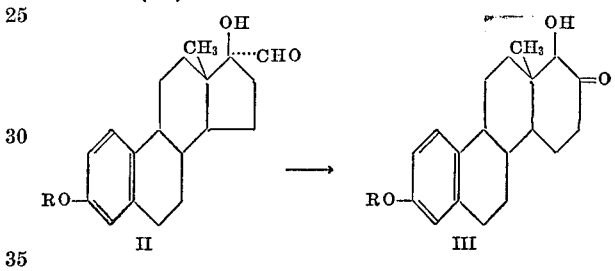

When the reaction is carried out thermally the compound of Formula II is heated above its melting point, generally between about 100° and 250° C. When the reaction is carried out in the presence of a Lewis acid the rearrangement takes place under ambient conditions, that is, the application of heat is not necessary.

A Lewis acid, as distinguished from a conventional protonic acid, is a molecule or ion that can combine with a second molecule or ion by forming a covalent chemical bond with two electrons from the second molecule or ion. Examples of Lewis acids are certain metal or metalloid halides or oxides, for instance, boron trifluoride, aluminum chloride, zinc chloride, silicon dioxide, and the like.

The compounds of Formula III can be subjected to conventional oxidation, reduction or esterification reactions to produce other compounds within the scope of Formula I, as illustrated in the examples below.

The compounds of Formula I wherein Z and Z' are both C=O are α,β-diketones and exit largely in the enol form wherein there is a double bond in the 16,17-position and hydroxy at C-17.

A lower-alkanone-cyclic acetal of a compound of Formula I wherein Z and Z' are each CH(OH) is prepared by reacting the latter with a lower-alkanone in the presence of a strong acid catalyst; for example, a sulfonic acid such as p-toluenesulfonic acid.

The intermediate 17-hydroxy - 3 - RO-estra-1,3,5(10)-triene - 17α - carboxaldehydes (II) are novel compounds and also within the purview of the invention. They are in turn prepared from the appropriate 17α-vinyl-17β-hydroxy-3-RO-estra - 1,3,5(10) - trienes either by ozonolysis or by osmium tetroxide oxidation followed by periodic acid cleavage. The starting 17α - vinyl-17β-hydroxy-3-RO-estra - 1,3,5(10) - trienes are a known class of compounds (U.S. Pat. 2,666,769) and can be prepared by partial hydrogenation of the corresponding 17α-ethynyl compounds.

The 17 - hydroxy-3-RO-estra - 1,3,5(10) - triene-17α-carboxaldehyde (II, R is hydrogen or lower-alkyl) can be further characterized by lithium aluminum hydride reduction to the corresponding 17 hydroxy-3-RO-estra-1,3,5(10)-triene - 17α - methanol which can be converted to its lower alkanone-cyclic 17,20-acetal (IV):

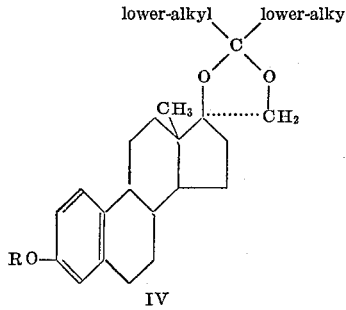

IV

The structures of the compounds of the invention were established by the modes of synthesis, by elementary analysis, and by ultraviolet, infrared and NMR spectra.

Endocrinological evaluation of the compounds of the invention having Formulas I, II and IV by standard methods has shown that they possess estrogenic and hypocholesteremic activity. The estrogenic acivity was measured by the degree of stimulation of growth of the uterus of immature female rats upon subcutaneous or oral administration. The hypocholesteremic activity was assessed by blood serum cholesterol analysis [Turner et al., Scand. J. Clin. Lab. Investigation 9, 210 (1949)] of male rats receiving the test compounds by oral administration as compared with a group of control rats receiving no medication.

The actual determination of the numerical biological data definitive for a particular compound is readily obtained by standard test procedures by technicians having ordinary skill in pharmacological test procedures, without the need for any extensive experimentation. The compounds of the invention are effective in amounts of 1–100 mg. per dosage unit depending upon the compound used and the manner of administration. They are prepared for use by conventional pharmaceutical formulation procedures used to formulate other steroid hormones; that is, in capsule or tablet form with conventional excipients (for example, calcium carbonate, starch, lactose, talc, magnesium stearate, gum acacia, and the like) for oral administration; or as an aqueous or oil suspension in a pharmaceutically acceptable vehicle (aqueous alcohol, glycol, oil solution, or oil-water emulsion) for parenteral administration.

The following examples will further illustrate the invention without the latter being limited thereby.

EXAMPLE 1

17-hydroxy-3-methoxyestra-1,3,5(10)-triene-17α-carboxaldehyde [II; R is $CH_3$]

A stream of ozone (0.12 mole) was bubbled through a stirred solution of 3-methoxy - 17α - vinylestra-1,3,5(10)-trien-17-ol (M.P. 107–109° C., 25.00 g., prepared from 3-methoxy - 17α - ethynylestra - 1,3,5(10) - trien-17ol in yields of 75–85% by hydrogenation over palladium on strontium carbonate) in methylene dichloride (40 ml.) and pyridine (5 ml.), cooled by means of a solid carbon dioxide-acetone bath (—70° C.). The mixture, which contained a white precipitate, was flushed for about 10 minutes with oxygen. Triethylamine (5 ml.) was added and the cooling bath was removed. After one hour the red solution, which had warmed to 25° C., was washed with 2 N hydrochloric acid (800 ml.), then with 2.5% sodium bicarbonate solution (800 ml.). It was dried over sodium sulfate and concentrated on the steam-bath under water aspirator vacuum to a yellow oil which was diluted to 100 ml. with acetonitrile. One-fourth (25 ml.) of the solution was reconcentrated and the residue was recrystallized twice from acetone-hexane to give 2.79 g. of 17 - hydroxy - 3 - methoxyestra - 1,3,5(10) - triene-17α-carboxaldehyde, ivory microcrystals. The solid began to melt at about 110° C., gradually resolidified, and remelted at 179–183° C.; $[\alpha]_D^{25} = +57.1°$ (1% in chloroform).

In the estrogenic activity test, 17-hydroxy - 3 - methoxyestra - 1,3,5(10) - triene - 17α - carboxaldehyde was found to have $ED_{50}=40$ mg./kg./day upon oral administration and 9.0 mg./kg./day upon subcutaneous administration ($ED_{50}$=dose capable of producing 50% of maximum uterine growth calculated from an estrone standard dose-response curve).

In the hypochloresteremic activity test, 17-hydroxy-3-methoxyestra - 1,3,5(10) - triene - 17α - carboxaldehyde was found to have $ED_{33}=3.6$ mg./kg./day (dose capable of reducing the serum cholesterol content by 33%).

By replacing the 3-methoxy-17α-vinylestra-1,3,5(10)-trien-17-ol in the foregoing preparation by a molar equivalent amount of 3-hydroxy - 17α - vinylestra-1,3,5(10)-trien-17-ol or 3-acetoxy - 17α - vinylestra - 1,3,5(10)-trien-17-ol, there can be obtained, respectively, 3,17-dihydroxyestra - 1,3,5(10) - trien - 17α - carboxaldehyde [II; R is H], or 3-acetoxy - 17 - hydroxyestra-1,3,5(10)-trien-17α-carboxaldehyde [II; R is $CH_3CO$].

EXAMPLE 2

(a) 17-hydroxy-3-methoxyestra-1,3,5(10)-triene-17α-methanol

A solution of 17-hydroxy-3-methoxyestra-1,3,5(10)-triene-17α-carboxaldehyde (prepared from 15.62 g. of 3-methoxy - 17α - vinylestra-1,3,5(10)-trien-17-ol and 0.075 mole of ozone) in 150 ml. of tetrahydrofuran was added during 20 minutes to a solution of 3.79 g. of lithium aluminum hydride in 150 ml. of tetrahydrofuran held under nitrogen. The mixture was heated for one hour under reflux. Water (7.6 ml.) was added dropwise with stirring and the mixture was filtered with suction through kieselguhr. Concentration of the cloudy solution at 40–50° C. under water aspirator vacuum gave a yellow oil. A solution of the yellow oil in chloroform (about 30 ml.) was washed with 2 N hydrochloric acid (100 ml.), then with 2.5% sodium bicarbonate solution (100 ml.), dried over sodium sulfate, filtered, and concentrated to a yellow oil, which solidified. The solid was recrystallized twice from acetonitrile to give 9.27 g. of 17-hydroxy-3-methoxyestra-1,3,5(10)-triene - 17α - methanol, colorless needles, M.P. 168–174° C. with an allotropic change in the middle of the range, $[\alpha]_D^{25} = +45°$ (1% in chloroform).

In the estrogenic activity test, 17-hydroxy-3-methoxyestra-1,3,5(10)-triene-17α-methanol was found to cause significant uterine growth at 1.0 mg./kg./day upon oral administration; and in the hypocholesteremic activity test, 17-hydroxy-3-methoxyestra-1,3,5(10)-triene - 17α - methanol was found to reduce the serum cholesterol level significantly at 128 mg./kg./day upon oral administration.

(b) 17-hydroxy-3-methoxyestra-1,3,5(10)-triene-17α-methanol 20-acetate

A solution of 1.00 g. of 17-hydroxy-3-methoxyestra-1,3,5(10)-triene-17α-methanol in pyridine (10 ml.) and acetic anhydride (10 ml.) was let stand for five hours at 25° C., then diluted with water (about 200 ml.). The resulting white solid was collected and dried: 1.13 g., M.P. 92–94° C. Recrystallization from acetonitrile gave 0.54 g. of 17-hydroxy-3-methoxyestra-1,3,5(10)-triene-17α-methanol 20-acetate in the form of colorless prisms of unchanged melting point; $[\alpha]_D^{25} = +29.7°$.

(c) 17-hydroxy-3-methoxyestra-1,3,5(10) - triene - 17α-methanol cyclic 17,20-acetone acetal [IV; R is CH₃, lower-alkyl is CH₃]

A mixture of 17 - hydroxy-3-methoxyestra-1,3,5(10) triene-17α-methanol (3.16 g.), p-toluenesulfonic acid monohydrate (0.02 g.), and acetone (60 ml.) was stirred for two hours at 25° C. The steroid dissolved as the reaction proceeded. Water (about 600 ml.) and 5% sodium bicarbonate solution (10 ml.) were added. The resulting white solid (3.54 g., M.P. 96–97° C.) was recrystallized from acetonitrile to give 17-hydroxy-3-methoxyestra-1,3,5 (10)-triene-17α-methanol cyclic 17,20-acetone acetal, colorless prisms, 2.78 g., M.P. 97–98° C.; $[\alpha]_D^{25} = +27.0°$ (1% in chloroform).

In the estrogenic activity test, 17-hydroxy-3-methoxyestra-1,3,5(10)-triene-17α-methanol cyclic 17,20-acetone acetal was found to have $ED_{50} = 35.0$ mg./kg./day upon oral administration; and in the hypocholesteremic activity test, $ED_{33} = 24$ mg./kg./day.

By the procedure described above in Example 2, 3,17-dihydroxyestra - 1,3,5(10)-triene-17α-carboxaldehyde can be reduced with lithium aluminum hydride to give 3,17-dihydroxyestra-1,3,5(10)-triene-17α-methanol. The latter can be treated with acetone or dibutyl ketone in the presence of p-toluene-sulfonic acid to give 3,17-dihydroxyestra-1,3,5(10)-triene-17α-methanol cyclic 17,20-acetone acetal [IV; R is H, lower-alkyl is CH₃] or cyclic 17,20-dibutyl ketone acetal [IV; R is H, lower-alkyl is C₄H₉].

EXAMPLE 3

17aβ-hydroxy-3-methoxy-D-homoestra-1,3,5(10)-trien-17-one [III; R is CH₃]

(a) With silica gel.—17-hydroxy-3-methoxyestra-1,3,5(10)-triene-17α-carboxaldehyde (prepared from 3.12 g. of 3-methoxy - 17α - vinylestra-1,3,5(10)-trien-17-ol and 0.011 mole of ozone) was chromatographed on a column of silica gel (100 g.). The column was eluted with 80:20 pentane-ether, collecting 100 ml. fractions. Fractions 21–45 were combined (1.64 g.) and recrystallized from acetonitrile to give 17aβ-hydroxy-3-methoxy-D-homoestra-1,3,5(10)-trien-17-one as colorless prisms, M.P. 183–185° C.

(b) With boron trifluoride.—Boron trifluoride etherate (47%, 3.0 ml.) was added to a solution of 17-hydroxy-3-methoxyestra-1,3,5(10)-triene - 17α - carboxaldehyde in acetonitrile (three-fourths, 75.00 ml., of the solution described in Example 1). The reaction was shown by thin layer chromatography to be complete after 10 minutes at 25° C. After 30 minutes the solution was quenched in water (about 1 liter). The resulting solid (18.41 g.) was recrystallized from acetonitrile to give 14.27 g. of 17aβ-hydroxy-3-methoxy - D - homoestra-1,3,5(10)-trien-17-one, M.P. 172–180° C. Recrystallization of part (3.00 g.) of this material from ethyl acetate gave a different crystalline form (colorless needles), M.P. 183–185° C. with a phase change at about 175° C.; $[\alpha]_D^{25} = +10.5°$ (1% in chloroform).

(c) With heat.—17-hydroxy-3-methoxyestra-1,3,5(10)-triene-17α-carboxaldehyde (13.8 mg.) was heated from 100° C. to 200° C. over a period of 20 minutes. The residue was triturated with a drop of acetonitrile and dried to give 13.8 mg. of 17aβ-hydroxy-3-methoxy-D-homoestra-1,3,5(10)-trien-17-one, M.P. 174–180° C. It was identical with the product obtained by method (a) by mixture M.P., infrared spectral, and thin layer chromatographic comparisons.

In the estrogenic activity test, 17aβ-hydroxy-3-methoxy-D-homoestra-1,3,5(10)-trien-17-one was found to cause significant uterine growth at 10.0 mg./kg./day upon oral or subcutaneous administration; and in the hypocholesteremic activity test it had $ED_{33} = 37$ mg./kg./day.

By procedures similar to those described above in Example 3, 3,17-dihydroxyestra - 1,3,5(10) - triene-17α-carboxaldehyde or 3-acetoxy-17-hydroxyestra-1,3,5(10)-triene-17α-carboxaldehyde can be rearranged to give 3,17aβ-dihydroxy-D-homoestra-1,3,5(10) - trien - 17 - one [III; R is H] or 3-acetoxy-17aβ-hydroxy-D-homoestra-1,3,5(10)-trien-17-one [III; R is CH₃CO].

EXAMPLE 4

17aβ-acetoxy-3-methoxy-D-homoestra - 1,3,5(10) - trien-17-one [I; R is CH₃, Z is CH(β-OCOCH₃), Z' is C=O]

A pyridine (15 ml.) and acetic anhydride (15 ml.) solution of the residues from the mother liquors from the preparation of Example 3, part (b) was let stand for 17 hours at 25° C. The solution was partitioned between chloroform (25 ml.) and dilute hydrochloric acid (0.67 N, 300 ml.). The chloroform layer was washed with 2.5% sodium bicarbonate solution, dried over sodium sulfate, filtered, concentrated, and chromatographed on silica gel (210 g.). An unidentified colorless oil was eluted in fractions 1–11 (400 ml.-fractions) with 90:10 pentane-ether. Estrone methyl ehter (0.70 g.) was eluted by 85:15 and 80:20 pentane-ether in fractions 12–25. Elution by 70:30 pentane-ether afforded 17aβ - acetoxy-3-methoxy-D-homestra-1,3,5(10)-trien-17-one (2.12 g., M.P. 194–202° C.) in fractions 36–45. Recrystallization from acetonitrile gave thin colorless prisms, M.P. 202–204° C.; $[\alpha]_D^{26} = +22.7°$ (1% in cloroform).

In the estrogenic activity test, 17aβ-acetoxy-3-methoxy-D-homestra-1,3,5(10)-trien-17-one was found to cause significant uterine growth at 100 mg./kg./day upon oral administration.

By replacing the acetic anhydride in the foregoing preparation by a molar equivalent amount of succinic anhydride, caproyl chloride, β-cyclohexylpropionyl chloride, p-nitrobenzoyl chloride, β-phenylpropionyl chloride, cinnamoyl chloride, p-chlorophenoxyacetyl chloride or nicotinoyl chloride, there can be obtained, respectively, 17aβ-(β-carboxypropionoxy)-3-methoxy - D - homoestra-1,3,5-(10)-trien-17-one [I; R is CH₃, Z is

Z' is C=O]; 17aβ - caproyloxy-3-methoxy-D-homoestra-1,3,5(10)-trien-17-one [I; R is CH₃, Z is

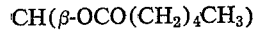

Z' is C=O]; 17aβ-(β-cyclohexylpropionoxy)-3-methoxy-D-homoestra-1,3,5(10)-trien-17-one [I; R is CH₃, Z is CH(β-OCOCH₂CH₂C₆H₁₁), Z' is C=O]; 17aβ-(p-nitrobenzoyloxy)-3-methoxy-D-homoestra-1,3,5(10) - trien-17-one [I; R is CH₃, Z is CH(β-OCO₆H₄NO₂-4), Z' is C=O]; 17aβ-(β-phenylpropionyloxy)-3-methoxy - D - homestra-1,3,5(10)-trien-17-one [I; R is CH₃, Z is

Z' is C=O]; 17aβ-cinnamoyloxy-3-methoxy - D - homoestra-1,3,5(10)-trien-17-one [I; R is CH₃, Z is

Z' is C=O]; 17aβ-(p-chlorophenoxyacetoxy)-3-methoxy-D-homoestra-1,3,5(10)-trien-17-one [I; R is CH₃, Z is CH(β-OCOCH₂OC₆H₄Cl-4), Z' is C=O]; or 17aβ-nicotinoyloxy-3-methoxy-D-homoestra-1,3,5(10) - trien - 17-one [I; R is CH₃, Z is CH(β-OCOC₅H₄N), Z' is C=O].

EXAMPLE 5

3-methoxy-D-homoestra-1,3,5(10)-triene-17β,17aβ-diol [I; R is CH₃, Z and Z' are CH(β-OH)]

(a) By lithium aluminum hydride reduction.—A solution of 17aβ-hydroxy-3-methoxy-D-homoestra-1,3,5(10)-trien-17-one (6.29 g.) in tetrahydrofuran (65 ml.) was added dropwise with stirring to a solution of lithium aluminum hydride (1.52 g.) in tetrahydrofuran (65 ml.). After heating the mixture for four hours under reflux, water (2.5 ml.) was added. The mixture was filtered with suction through kieselguhr and the cloudy filtrate was concentrated at 40–50° C. under water aspirator vacuum to an oil. A chloroform solution (about 100 ml.) of the oil was washed with 2 N hydrochloric acid (100 ml.). The mixture was filtered through kieselguhr to remove insoluble aluminum salts. The chloroform layer was washed with 2.5% sodium bicarbonate solution (100 ml.), dried over sodium sulfate, filtered and concentrated with a large volume of ethyl acetate to about 100 ml. Dense colorless granules separated and two subsequent crops were collected. Recrystallization of the granules from chloroform-ethyl acetate gave 3.96 g. of 3-methoxy-D-homoestra-1,3,5(10)-triene-17β,17aβ-diol, M.P. 187–191° C.;

$$[\alpha]_D^{25} = +82.3°$$

(1% in chloroform).

(b) By sodium-isopropyl alcohol reduction.—Freshly cut sodium (9.2 g.) was added in small pieces at regular intervals over a period of two hours to a refluxing solution of 6.29 g. of 17aβ-hydroxy-3-methoxy-D-homoestra-1,3,5(10)-trien-17-one in 400 ml. of isopropyl alcohol held under nitrogen pressure. The mixture was cooled and quenched in 2 liters of ice-water containing 0.48 mole of hydrochloric acid. This mixture was extracted with chloroform, and the chloroform extracts were washed with 5% sodium bicarbonate solution, dried over anhydrous sodium sulfate, filtered and concentrated. The residue was chromatographed on silica gel, the column eluted with 40:60 pentane-ether, and fractions of 400 ml. were cut. The material from fractions 18–35 was recrystallized from acetonitrile to give 3-methoxy-D-homoestra-1,3,5-(10)-triene-17β,17aβ-diol, M.P. 181–187° C.

In the estrogenic activity test, 3-methoxy-D-homoestra-1,3,5(10)-triene-17β,17aβ-diol was found to cause significant uterine growth at 100 mg./kg./day upon oral administration; and in the hypocholesteremic test it had $ED_{33} = 20$ mg./kg./day.

EXAMPLE 6

17β,17aβ-diacetoxy-3-methoxy - D - homoestra - 1,3,5-(10)-triene [I; R is $CH_3$, Z and Z' are $CH(\beta\text{-OCOCH}_3)$] was prepared by acetylation of 3-methoxy-D-homoestra-1,3,5(10)-triene-17β,17aβ-diol (obtained by lithium aluminum hydride reduction of 4.95 g. of 17aβ-hydroxy-3-methoxy-D-homoestra-1,3,5(10)-trien-17-one) with 25 ml. of acetic anhydride in 25 ml. of pyridine, 23 hours at 25° C. The reaction mixture was quenched in dilute hydrochloric acid, and the resulting solid was collected and chromatographed on 160 g. of silica gel. The desired product (3.88 g.) was eluted by 80:20 pentane-ether in fractions 16–29 (400 ml. fractions), and was recrystallized from acetonitrile to give 17β,17aβ-diacetoxy-3-methoxy - D - homoestra - 1,3,5(10) - triene, colorless microscopic crystals, M.P. 159–161° C.; $[\alpha]_D^{25} = +44.9°$ (1% in chloroform).

In the estrogenic activity test, 17β,17aβ-diacetoxy-3-methoxy-D-homoestra-1,3,5(10)-triene was found to cause significant uterine growth at 100 mg./kg./day upon oral administration; and in the hypocholesteremic test it caused significant lowering of serum cholesterol at 64 mg./kg./day.

EXAMPLE 7

3-methoxy-D-homoestra-1,3,5(10)-triene-17β,17aβ-diol cyclic acetone acetal

A solution of 3-methoxy-D-homoestra-1,3,5(10)-triene-17β,17aβ-diol (1.53 g.), p-toluenesulfonic acid monohydrate (0.05 g.), and acetone (45 ml.) was stirred for 24 hours at 25° C. 2,2-dimethoxypropane (90%, 0.50 g.) was added and stirring was continued for six hours. The solid (1.65 g.) obtained by quenching the reaction solution in dilute sodium bicarbonate was collected and percolated through silica gel (100 g.) with 80:20 pentane-ether. Fractions of about 200 ml. were cut. The product (1.42 g., M.P. 141–143° C.) appeared in fractions 1–5 and was recrystallized from acetonitrile to give 3-methoxy-D-homoestra-1,3,5(10)-triene-17β,17aβ-diol cyclic acetone acetal, colorless needles, M.P. 143–144° C.; $[\alpha]_D^{25} = -30.6°$ (1% in chloroform).

In the estrogenic activity test, 3-methoxy-D-homoestra-1,3,5(10)-triene-17β,17aβ-diol cyclic acetone acetal was found to cause significant uterine growth at 100 mg./kg./day upon oral administration.

EXAMPLE 8

3-methoxy-D-homoestra-1,3,5(10)-triene-17α,17aβ-diol [I; R is $CH_3$, Z is $CH(\beta\text{-OH})$, Z' is $CH(\alpha\text{-OH})$]

(a) By sodium -isopropyl alcohol reduction.—The material from fractions 31–47 from the silica gel chromatogram in Example 5(b) was recrystallized from ethyl acetate to give 3-methoxy-D-homoestra-1,3,5(10)-triene-17α,17aβ-diol as colorless, microscopic crystals, M.P. 165–166° C.; $[\alpha]_D^{25} = +67.0°$ (1% in chloroform).

(b) By lithium aluminum hydride reduction.—A mixture of the residue (2.18 g.) obtained from the chloroform-ethyl acetate mother liquors of recrystallization in Example 5(a), acetone (40 ml.), and p-toluenesulfonic acid monohydrate (0.015 g.) was stirred at 25° C. for 46 hours. The resulting solution was partitioned between 2.5% sodium bicarbonate solution (200 ml.) and chloroform (20 ml.). The aqueous phase was further extracted with chloroform (3 × 5 ml.). The combined chloroform extracts were dried over sodium sulfate, filtered, concentrated, and chromatographed on silica gel (100 g.). Fractions of about 200 ml. were cut, and the column was eluted with 90:10 pentane-ether (fractions 1–45), 60:40 pentane-ether (fractions 46–53) and ether (fractions 54–65). The material from the ether fractions was recrystallized from ethyl acetate to give 3-methoxy-D-homoestra-1,3,5(10) - triene - 17α,17aβ - diol, M.P. 163–165° C.; $[\alpha]_D^{25} = +67.5°$ (1% in chloroform).

In the estrogenic activity test, 3-methoxy-D-homoestra-1,3,5(10)-triene-17α,17aβ-diol was found to cause significant uterine growth at a dose level of 100 mg./kg./day upon oral administration; and in the hypocholesteremic activity test it was found to cause significant lowering of the serum cholesterol content at 32 mg./kg./day.

EXAMPLE 9

17α,17aβ-diacetoxy-3-methoxy-D-homoestra-1,3,5(10)-triene [I; R is $CH_3$, Z is $CH(\beta\text{-OCOCH}_3)$, Z' is $CH(\alpha\text{-OCOCH}_3)$] was prepared by acetylation of 63.6 mg. of 3 - methoxy - D - homoestra - 1,3,5(10)-triene-17α,17aβ-diol with 1 ml. of acetic anhydride in 1 ml. of pyridine. The product was recrystallized from acetonitrile to give 17α,17aβ - diacetoxy - 3-methoxy-D-homoestra-1,3,5(10)-triene, M.P. 183–184.5° C.; $[\alpha]_D^{25} = +15.1°$ (1% in chloroform).

EXAMPLE 10

3-methoxy-D-homoestra-1,3,5(10)-triene-17α,17aβ-diol cyclic acetone acetal

A mixture of 3-methoxy-D-homoestra-1,3,5(10)-triene-17α,17aβ-diol (0.32 g.), 2,2-dimethoxypropane (0.21 g.), p-toluenesulfonic acid monohydrate (0.01 g.), and acetone (6.0 ml.) was stirred at 25° C. for 24 hours. Since at this time solid still remained suspended, tetrahydrofuran (6.0 ml.) was added and stirring was continued for 24 hours longer. Molecular sieves (1.0 g.) were added and stirring was continued for 96 hours. Chloroform (about 6 ml.) was added to dissolve the organic portion of the precipitate and the mixture was stirred with sodium bicarbonate (0.42 g.) for two hours. It was filtered with suction through kieselguhr. After being concentrated to about 5.0 ml. the filtrate was streaked onto a 20 cm. x 40 cm. thick layer chromatographic plate, which was developed with chloroform. The product (0.33 g., M.P. 191–193° C.) was extracted from the band which appeared at $R_F$ 0.20–0.49. It recrystallized from ethyl acetate to give 3-methoxy-D-homoestra-1,3,5(10)-triene-17α,17aβ-diol cyclic acetone acetal as colorless plates, M.P. 197–198° C.; $[\alpha]_D^{25} = +80.9°$ (1% in chloroform).

EXAMPLE 11

17-hydroxy-3-methoxy-D-homoestra-1,3,5(10),16-tetraen-17a-one [I; R is CH₃, Z and Z' are C=O, enol form]

A solution of t-butyl alcohol (100 ml.), potassium t-butoxide (4.49 g.) and one-fifth of the 17aβ-hydroxy-3-methoxy - D - homoestra-1,3,5(10)-trien-17-one, obtained from the ozonolysis of 3 - methoxy - 17α - vinylestra-1,3,5(10)-trien-17-ol (25.00 g.) followed by boron trifluoride rearrangement of the resulting crude aldehyde, was stirred for four hours at 25° C. It was quenched in water (0.6 liter) containing hydrochloric acid (0.060 mole) and the quench was extracted with chloroform (1× 30 ml., 2× 10 ml.). The combined chloroform extracts were washed with 2.5% sodium bicarbonate solution, dried over sodium sulfate, filtered and concentrated. The residue was chromatographed on silica gel (160 g.). Fractions of about 400 ml. were cut. The product (1.94 g., M.P. 173–175° C.) was eluted in fractions 4–15 by 80:20 pentane-ether and crystallized from acetonitrile to give 17 - hydroxy - 3-methoxy-D-homoestra-1,3,5(10),16-tetraen-17a-one as colorless blades, M.P. 176–177° C.; $[\alpha]_D^{25} = +34.3°$ (1% in chloroform).

In the estrogenic activity test, 17-hydroxy-3-methoxy-D-homoestra - 1,3,5(10),16 - tetraen-17a-one was found to cause significant uterine growth at a dose level of 100 mg./kg./day upon oral administration; and in the hypocholesteremic activity test it had $ED_{33}=32$ mg./kg./day.

I claim:
1. (A) A compound of the formula

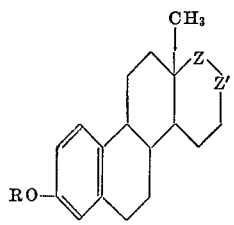

wherein R is hydrogen, lower-alkyl of from one to six carbon atoms, or acyl; and Z and Z' are C=O, CH(OH) or CH(O-acyl), acyl in each instance being carboxylic acyl having from one to twelve carbon atoms and selected from the group consisting of lower-alkanoyl, carboxy-lower-alkanoyl, cycloalkyl-lower-alkanoyl where cycloalkyl has 5–6 ring members, phenyl-lower-alkanoyl, phenyl-lower-alkenoyl, phenoxy-lower-alkanoyl, carbamyl, N - lower-alkylcarbamyl, N,N-di-lower-alkylcarbamyl and pyridylcarbonyl; (B) a lower-alkanone-cyclic acetal of a compound of the above formula wherein Z and Z' are each CH(OH), the lower-alkanone moiety having from three to ten carbon atoms; or (C) the 16,17-dehydro derivative of the compound of the above formula where R is methyl, Z is C=O and Z' is CH.

2. 17aβ - hydroxy-3-methoxy-D-homoestra-1,3,5(10)-trien-17-one, according to claim 1.

3. 17aβ - acetoxy - 3-methoxy-D-homoestra-1,3,5(10)-trien-17-one, according to claim 1.

4. 3 - methoxy-D-homestra-1,3,5(10)-triene-17β,17aβ-diol, according to claim 1.

5. 17β,17aβ - diacetoxy - 3-methoxy-D-homoestra-1,3,5(10)-triene, according to claim 1.

6. 3 - methoxy-D-homoestra-1,3,5(10)-triene-17β,17aβ-diol acetone-cyclic acetal, according to claim 1.

7. 3 - methoxy-D-homoestra-1,3,5(10)-triene-17α,17aβ-diol, according to claim 1.

8. 17 - hydroxy-3-methoxy-D-homoestra-1,3,5(10),16-tetraen-17a-one, according to claim 1.

9. The process for preparing a compound of claim 1 wherein Z is CH(β-OH) and Z' is C=O which comprises heating above its melting point 17-hydroxy-3-RO-estra-1,3,5(10)-triene-17α-carboxaldehyde, wherein R is hydrogen, lower-alkyl or carboxylic acyl; or treating the latter with a Lewis acid.

References Cited
UNITED STATES PATENTS 3,364,207   1/1968   Brown _____ 260—340.9 X
3,492,338   1/1970   Haden _____ 260—488

ALEX MAZEL, Primary Examiner

J. H. TURNIPSEED, Assistant Examiner

U.S. Cl. X.R.

260—239.55, 295, 295.5, 397.4, 468, 473, 476, 485, 488, 561, 586, 611, 617; 424—238, 241, 263, 264, 278, 308, 311, 313 314, 331, 339, 343